UNITED STATES PATENT OFFICE.

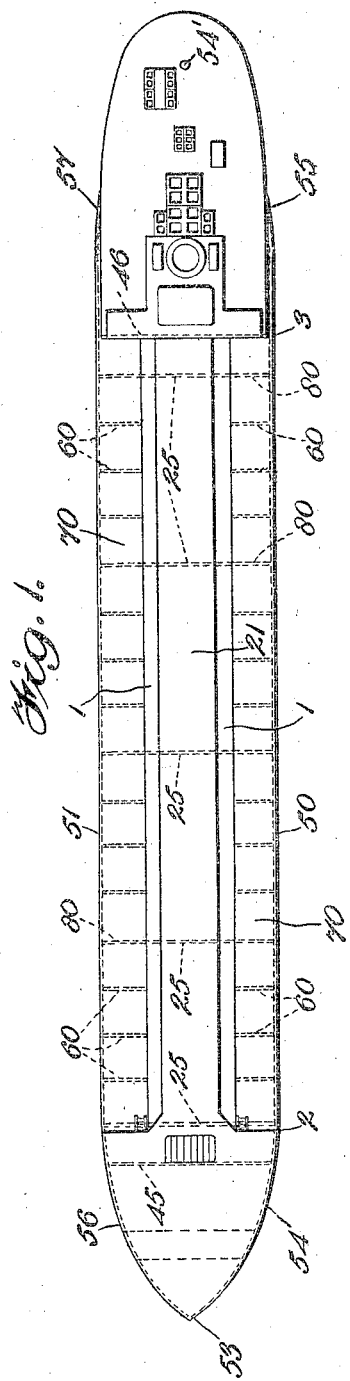

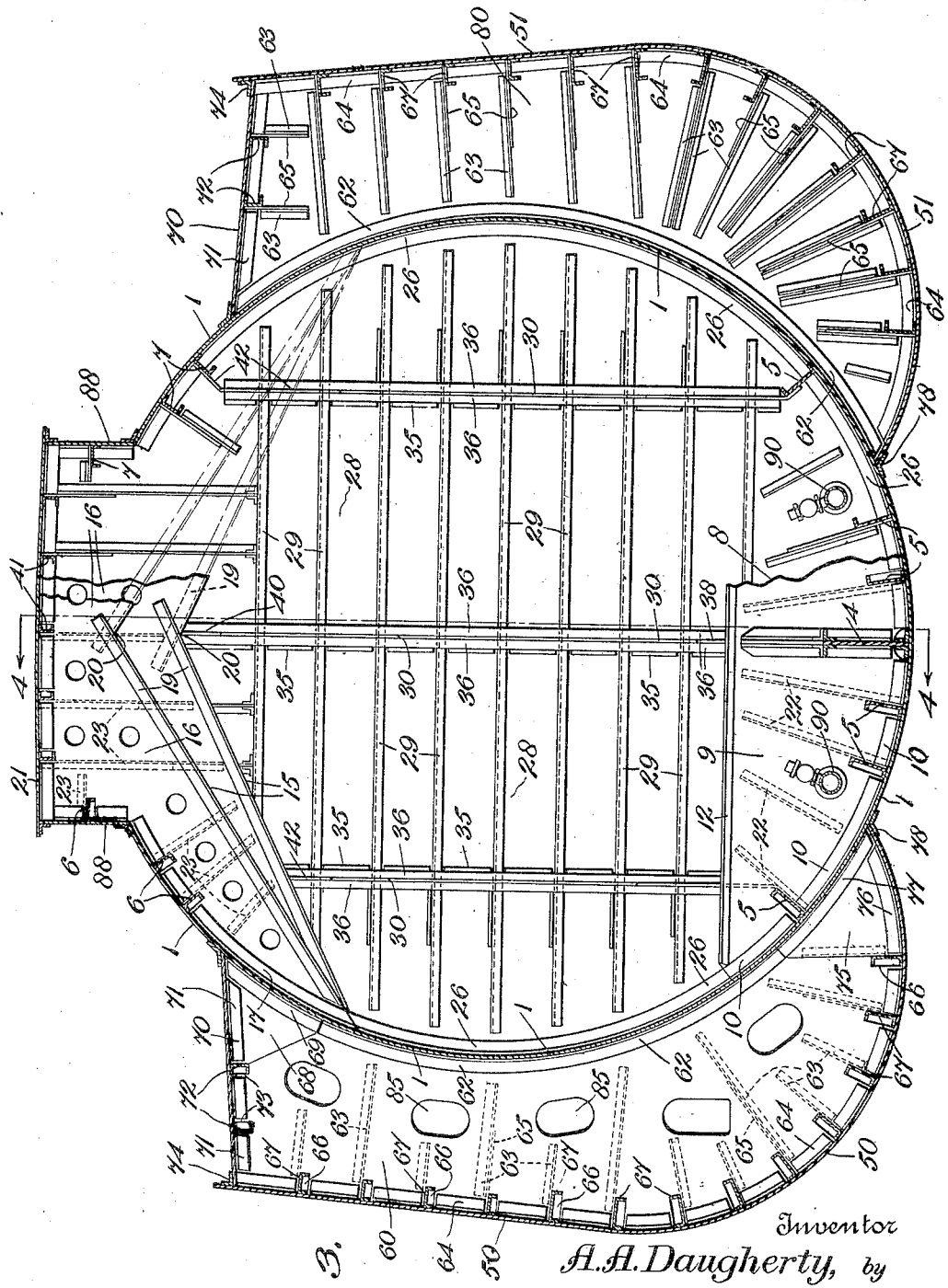

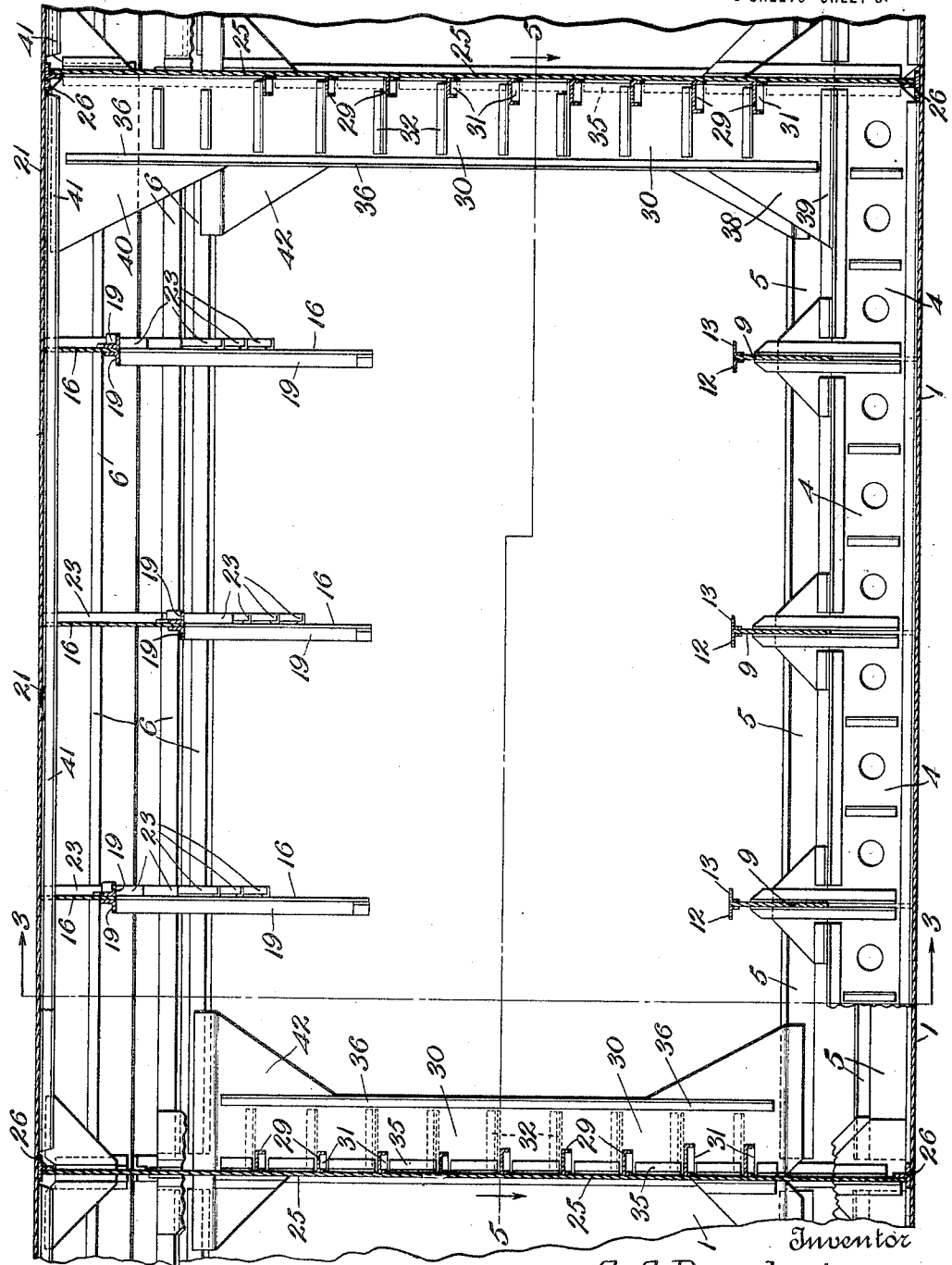

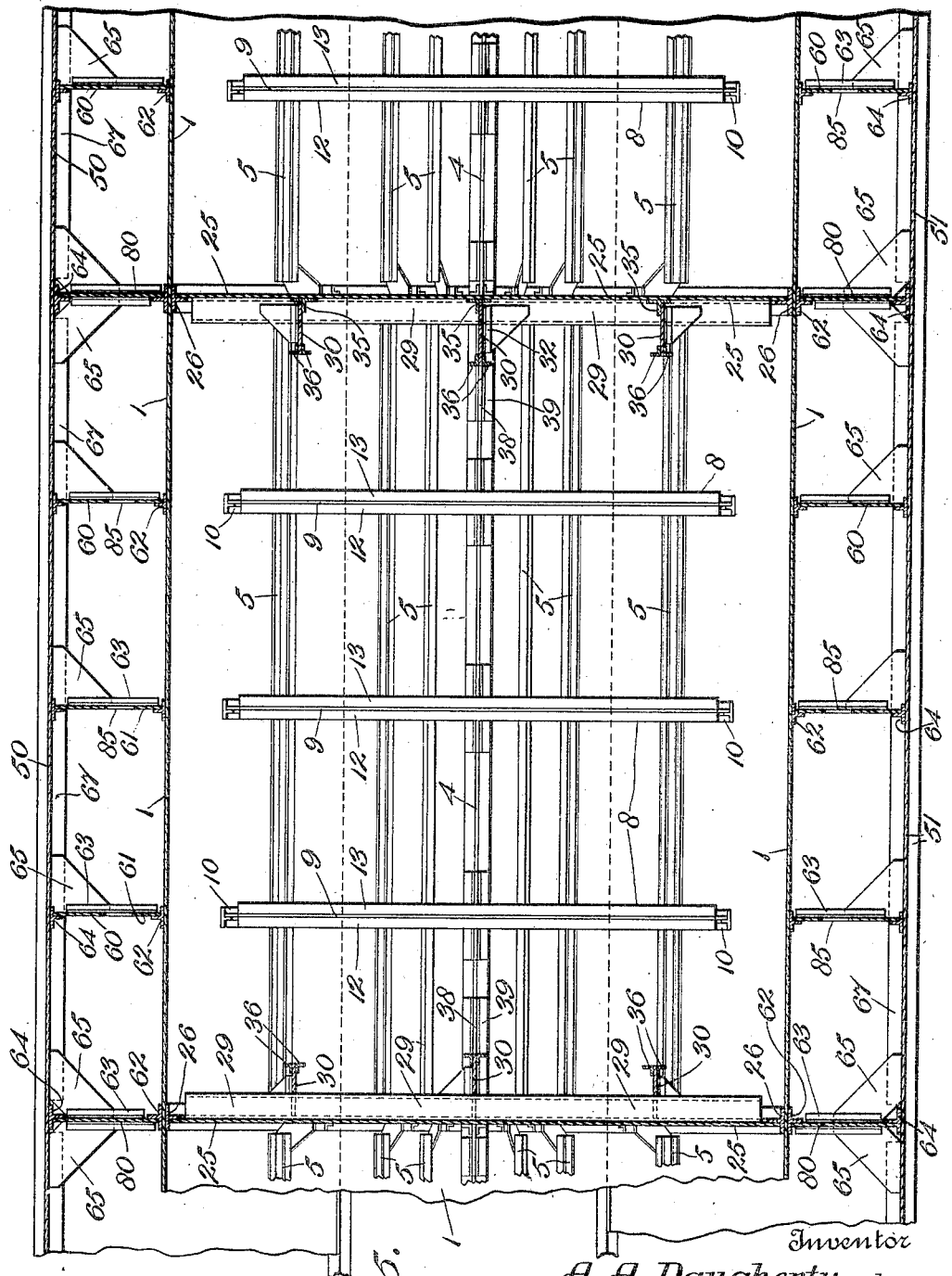

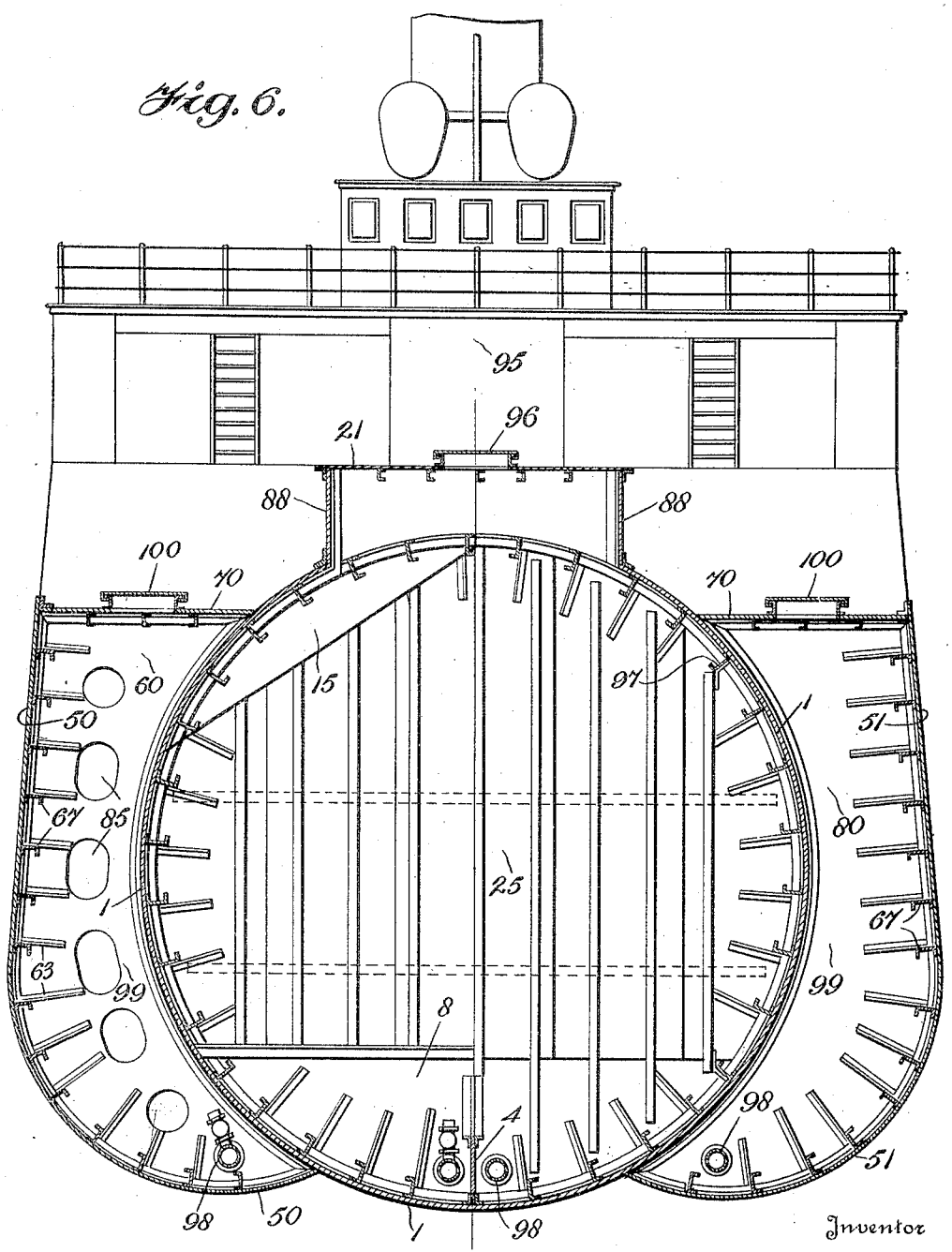

ALVIN A. DAUGHERTY, OF NEW YORK, N. Y., ASSIGNOR, BY MESNE ASSIGNMENTS, TO THE NATIONAL OIL COMPANY, OF NEW YORK, N. Y., A CORPORATION OF NEW JERSEY.

SHIP CONSTRUCTION.

1,319,462.   Specification of Letters Patent.   Patented Oct. 21, 1919.

Application filed March 26, 1917. Serial No. 157,402.

*To all whom it may concern:*

Be it known that I, ALVIN A. DAUGHERTY, a citizen of the United States, residing at New York city, in the county of New York and State of New York, have invented certain new and useful Improvements in Ship Constructions; and I do hereby declare the following to be a full, clear, and exact description of the invention, such as will enable others skilled in the art to which it appertains to make and use the same.

This invention relates to an improved construction of ships and has for its object to build ocean going or other vessels in a manner more expeditious and less costly than has been heretofore proposed.

With these and other objects in view the invention consists in the novel details of construction, and combinations of parts more fully hereinafter disclosed and particularly pointed out in the claims.

Referring to the accompanying drawings forming a part of this specification in which like numerals designate like parts in all the views:—

Figure 1 is a diagrammatic plan view of a vessel built in accordance with this invention;

Fig. 2 is a side elevational view partly broken away of the construction shown in Fig. 1;

Fig. 3 is an enlarged transverse cross sectional view taken on the line 3—3 of Figs. 2 and 4, looking in the direction of the arrows;

Fig. 4 is an enlarged vertical longitudinal sectional view of a portion of the vessel taken on the line 4—4 of Fig. 3, looking in the direction of the arrows;

Fig. 5 is an enlarged sectional plan view of the parts shown in Fig. 4, taken on the line 5—5 of Fig. 4, looking in the direction of the arrows; and Fig. 6 is a partially transverse sectional, partially elevational view of a slightly modified form of the invention.

1 indicates an outer shell preferably cylindrical in cross section extending throughout the main body portion of the vessel, terminating forward at the beginning 2 of the curved portion of the bows, and terminating aft at the beginning 3 of the curved portion of the stern.

Said cylindrical main body portion 1 is provided on each side of the keelson 4 with a plurality of relatively shallow longitudinals 5, and near the top portion of said cylindrical main body portion there is located on each side thereof the additional shallow longitudinals 6 and 7 as illustrated. As best shown in Figs. 2 and 3, said main body portion 1 is further provided at predetermined intervals with the sector shaped transverse frames 8 each consisting of a vertical plate structure 9 secured on its outboard edge to the said cylindrical shell portion 1 by the curved angles or T-bars 10 and each stiffened along its inboard or upper edge as by the angles 12 and 13.

Located above each of said sector shaped transverse frames and in the same cross sectional plane thereof is what might be termed a transverse V-shaped truss frame 15 which is composed of a vertical plate like structure 16 secured on its outboard edge by the angles 17, and stiffened on its inboard edge by the angles 19, as best shown in full and dotted lines in Figs. 3 and 4. The said angles 19 stiffening the plate structures 15 on each side of the vessel extend upwardly toward the middle line of the vessel and are conveniently crossed as at 20, see Fig. 3.

This said cylindrical main body portion is further open on its top between the beginning 3 of the stern portion and the beginning 2 of the bow portion of the vessel as is plainly indicated in Fig. 1 and said opening is conveniently covered by the expansion trunk or hatch structure 21 as plainly shown in Figs. 1 and 3. The said transverse V-shaped trusses 15 extend up into this said opening, as plainly shown in the drawings, and thus serve to greatly strengthen the cylindrical structure 1. The said lower sector shaped transverses 8 are conveniently stiffened on their faces as by the angles 22 some of which are joined to the longitudinals 5 as illustrated, and the said plates 16 of the upper transverses 15 are likewise stiffened as by the angles 23, some of which are also joined to the longitudinals 6 and 7 as will be clear from the drawings. These said transverses 8 and 15 are relatively very widely spaced apart and are relatively very strong in cross section, in accordance with the well known Isherwood system of ship construction, while at predetermined intervals throughout the ship and preferably in the same plane with said transverses there is provided the transverse bulk heads 25. These said bulk heads 25 are likewise secured at their outboard edges to the cylindrical shell 1 as by means of the curved angles or T-bars 26, and they are made up of plates 28 stiffened throughout their extent as by the horizontally disposed angles 29 and by the vertically disposed stiffening plates 30. Said stiffening plates 30 are conveniently notched as at 31 to permit the said angles 29 to pass therethrough and preferably at each notch 31 the said plates 30 are or may be provided with the stiffening vertical angles 32 as shown. The edges of said vertical plates 30, nearest to the bulk heads 25, are conveniently secured to said bulk heads as by the angles 35 and the edges of said plates 30 farthest removed from said bulk heads 25 are stiffened as by the angles 36. These said plates 30 are preferably 3 in number at each bulk head and the two outboard ones are conveniently secured at their lower ends to the corresponding longitudinals 5 and are conveniently secured at their upper ends to the corresponding longitudinals 6 and 7, all as will be clear from Fig. 3. The middle plate 30 of each bulkhead is conveniently passed down and secured to the keelson 4 as by the flanged bracket or plate 38 and the angle 39 as best shown in Figs. 4 and 5. At the upper end of each central vertical plate 30 there is also provided plates or brackets 40 corresponding in all respects to the plate 38 which are secured to the longitudinal members 41 carried by the expansion trunk cover structure 21. Other brackets 42 are secured at the upper ends of the outboard plates 30 on each bulkhead and to the longitudinals 6 and 7, all as will be clear from Figs. 3 and 4.

As above stated, this cylindrical structure stiffened and partitioned off, terminates at the point 2 or at the beginning of the curved portion of the bows and at the point 3 or the beginning of the curved portion of the stern. It is conveniently provided at its extreme ends with bulkheads which are lettered 45 and 46, so that this said cylindrical structure can be made as an entity, and it will float as a separate vessel, should the other parts of the ship, now to be disclosed, become damaged from any cause.

The cross sectional shape of a cylindrical structure such as 1 is, of course, not a very desirable sea worthy construction, and therefore, I provide the outer shell structures 50 and 51 on each side of said cylindrical structure 1, and I extend these said structures 50 and 51 from the stem to the stern of the vessel so as to give it the desired outer contour or shape.

In other words, the outer shell structure 50 not only extends between the bulkheads 45 and 46, but it also extends from the bulkhead 45 to the stem 53, thus forming the curved portion 54 of the port bow, and it extends from the bulkhead 46 to the stern post which for convenience may be said to be located at or near the point 54', see Figs. 1 and 2, thus forming the port side 55 of the stern. In the same way, the said outer shell portion 51 constitutes the starboard side 56 of the bow and the portside 57 of the stern. Each of these outer shell structures 50 and 51 of course must be properly stiffened and made an integral portion of the ship, and this is accomplished as follows:—

Referring more particularly to Figs. 3 and 5, there are provided in the same transverse plane with the Isherwood transverses 8 and 15, the outer transverse frames 60. Each transverse frame 60 is conveniently made up of the plate structure 61, shaped as best illustrated in Fig. 3, and secured on its inboard edge to the outer surface of the cylindrical structure 1 as by the curved angles or T-bars 62. These said plates 61 are further stiffened on their faces by the transversely disposed angles 63, and said plates 61 are secured at their outboard edges to the outer shell plating 50, as by the angles or T-bars 64, as well as by the brackets or plates 65, as best illustrated in Fig. 5.

In addition to the above stiffening members, the said outboard transverses 60 are provided with notches 66 through which pass the relatively shallow continuous longitudinals 67, similar to the continuous longitudinals employed in the well known Isherwood construction. These said longitudinals 67 extend from the stem to the stern of the vessel, and serve the same functions as similar longitudinals in the well known Isherwood ships.

Near the inboard upper corner of each plate structure 61 is provided the triangular shaped brackets or stiffening plates 68 secured along one edge to the cylindrical structure as by the angles or T-bars 69, and secured to the top deck plating 70 as by the angles or T-bars 71. Said top plate deck structure 70 is provided with the longitudinal beams 72 passing through notches 73 in the upper edges of the plate structure 61. And said deck structure is further secured to the inner side of the outer shell plating 50 as by the channel bars 74. The extreme lower inner corner of the plate structure 61 is further secured to the cylindrical shell plating 1, as by the bracket or plate 75 in all respects similar to the bracket or plate 68 and appropriate angle or T-bars 76 and 77 are employed to secure said plate 75 to the shell plating 50 and to the structure 1 respectively, all as will be clear from Fig. 3 of the drawings.

An outer angle plate 78 is conveniently located between the outer shell plating 1 and the outer shell plating 50, at the extreme lower edge of the latter as shown.

The above construction is best illustrated in elevation for the port side of the vessel in Fig. 3. The starboard side of the vessel has precisely the same construction, but the section on which Fig. 3 is taken does not duplicate it, but instead thereof, discloses the construction adopted where bulkheads are employed. That is to say, about every fourth Isherwood transverse 8 there is located a bulk head in the cylindrical construction 1 as above stated, and this bulkhead construction is extended on each side of said cylindrical construction 1 and out to the shell platings 50 and 51 respectively, all as will be clear from Figs. 3 and 5. In said figures, 80 represents the plating of which said bulkheads are composed and said plating is provided with the surface stiffening members 63 corresponding in all respects to the stiffening members 63 above disclosed in connection with the plating 60. Said plating is secured to the shell plating 1 by the T-bar or angle construction 62 similar in all respects to the corresponding construction on the port side of the vessel. It is not provided with notches for its longitudinals 67 in all respects similar to the longitudinals 67 on the port side of the vessel, for said longitudinals terminate at said plating 80. Said longitudinals 67, however, are provided with brackets 65 which are in all respects similar to or duplicates of the brackets 65 mentioned in connection with the port side construction. As above stated, this said bulkhead construction between the inner shell plating 1 and the outer shell plating 51 is duplicated on the port side of the vessel and corresponding parts are correspondingly lettered.

It will thus be seen that the shell plating 80 extending between the cylindrical structure 1 and the outer shell structure 50 and 51 cuts off the space between said inner and outer shell platings into compartments, which compartments are suitable for carrying liquid cargo or for other purposes. In order that there may be free communication from one end of each compartment to the other, the outer transverses 60 are provided with the openings 85, and of course, suitable hatches or other openings, not shown, giving access to each compartment may be provided in the deck plating 70 wherever desired.

It will now be seen that a ship built according to this invention is composed of an inner cylindrical shaped main body portion provided with a longitudinal opening along its upper surface to which is fitted the expansion trunk 88 which trunk is closed by any suitable structure such as 21; that it is provided near its bottom portion with the widely spaced and relatively very strong sector shaped transverses 8; that near its upper portion and extending well up into said expansion trunk construction 88 it is further provided with widely spaced and relatively very strong transverses 15 located in the same transverse plane as said transverse 8; that at suitable intervals throughout said main body portion there is located in the same plane with a pair of said transverses 8 and 15 the transverse bulkheads 25 thus dividing off the said main body portion into convenient storage spaces; that said bulkheads 25 are braced as by the vertical plates or pillars 30 and their coacting parts; and that the extreme ends of said cylindrical main body portion are conveniently closed as by additional transverse bulkheads lettered 45 and 46.

It will likewise be clear that this said stiffened and divided cylindrical main body portion, blunt at each end, is inclosed on each side by a cradle-like structure formed from the outer side plating 50 and 51, which extends from the stem to the stern of the vessel, and which gives the vessel its outer contour; that said outer shell plating 50 and 51 is likewise provided with outer transverses 60 in the same transverse plane as said transverses 8 and 15; and that said outer shell plating 50, 51 is further provided with transverse bulkheads 90 in the same transverse plane as said bulkheads 25.

The above being the construction of this vessel the following advantages are derived therefrom:—

It is relatively a simple matter to build the inner cylindrical main body portion 1, because the construction simulates so nearly that of boiler construction, and therefore, a great deal of expensive machinery and appurtenances which are necessary to build modern steel liquid cargo carrying vessels can be dispensed with. Further the construction of boilers and like vessels has now been so thoroughly developed that a main body portion of this nature can be built in a very much less time and at a very much less expense than can the main body portion of other vessels. Having once constructed the main body portion 1, of the vessel, in the manner above indicated, then with similar simple and comparatively inexpensive machinery and appurtenances the outer shell plating 50 and 51 together with its bracing structures can be readily fitted to said main body portion 1, with the result that a ship of a given carrying capacity built after this construction can be finished and sent to sea in a very much less time than can a ship built according to the methods heretofore proposed.

In addition to the above, by adopting the economical principles of metal distribution, disclosed in the well known Isherwood U. S. Patent 1029546, I am not only enabled to save very greatly in the time and expense necessary to build a vessel of this nature, but I am enabled likewise to save considerably in the amount of metal it is necessary to place in the vessel. In other words, by disposing of the metal going into the transverses and into the bulkheads, in the manner disclosed above, I am enabled to employ a minimum weight of metal while obtaining a maximum stiffness and sea worthiness in the vessel.

Of course, vessels of this nature are provided with the usual piping system for loading and discharging the liquid cargo and also with other appurtenances and conveniences which are not shown, but some of the pipes of which are indicated as at 90, see Fig. 3.

It is an important feature of the invention that the abnormally widely spaced transverses 8, 15 and 60 are all located in the same transverse plane, that while they constitute a single stiffening transverse, they are yet disposed of in single parts no one of which extends circumferentially entirely around the shell plating 1. For these said individual parts are not only easier and less costly to construct and erect, but those lettered 8 and 15 serve to prevent the oil from violently passing fore and aft from one portion of the tank to the other in heavy seas and thereby they greatly steady the action of the cargoes in rough weather.

Not only do the transverses 8 especially have this function but by preventing the oil or other liquid from washing longitudinally of the keel 4, it prevents wearing away the bottom skin of the vessel. The vertical plates 30 further serve to prevent the oil from violently passing transversely of the tank from one side of the vessel to the other.

In the somewhat modified form of the invention illustrated in Fig. 6, the main essential ideas are the same as those just disclosed but I have indicated the superstructure 95 which it is convenient to add to vessels of this nature; I have indicated the hatch structure 96 with which the structure 21 may be conveniently provided; and I have indicated more longitudinals 97 on the interior of the main body portion 1 as well as the pipe system 98 which may conveniently pass through the compartments 99 located between the inner shell 1 and the outer shell 50 and 51. I have further indicated hatch openings such as 100 extending through the deck structure 70 and giving access to the compartments 99. The other features of construction are or may be substantially the same as those disclosed in connection with Figs. 3, 4 and 5.

It is obvious that those skilled in the art may vary the details of the construction as well as the arrangement of parts without departing from the spirit of the invention and therefore I do not wish to be limited to the above disclosure except as may be required by claims.

What I claim is:—

1. In a vessel of the character described the combination of an outer shell; an inner cylindrical main body portion in said shell provided with continuous longitudinal frames; bottom transverse frames extending from side to side of said main body portion, provided with notches through which said continuous longitudinal frames pass; top transverse frames also extending from side to side of said main body portion provided with notches through which said longitudinals pass; and circumferentially stopping short of said bottom transverses; and a plurality of bulkheads, spaced farther apart than said transverse frames, but each occupying the same transverse plane as a top and bottom transverse frame, substantially as described.

2. In a vessel of the character described the combination of an outer shell; an inner cylindrical main body portion in said shell having an expansion trunk and provided with continuous longitudinal frames; bottom transverse frames extending from side to side of said main body portion provided with notches through which said continuous longitudinal frames pass; top transverse frames extending into said trunk and also extending from side to side of said main body portion provided with notches through which said longitudinals pass, and circumferentially stopping short of said bottom transverses; and a plurality of bulkheads spaced farther apart than said transverse frames, but each occupying the same transverse plane as a top and bottom transverse frame, substantially as described.

3. In a vessel of the character described the combination of an inner cylindrical shell forming a main body portion provided with abnormally spaced and abnormally deep inner, top and bottom transverses circumferentially separated from each other and in the same transverse plane; an outer shell spaced from, and extending beyond the ends of said inner shell portion to form the bow and stern of the vessel; outer transverses in the same plane as said inner transverses provided with notches and circumferentially closing the spaces between said top and bottom transverses; and continuous longitudinals passing through said notches, substantially as described.

4. In a vessel of the character described the combination of an outer shell; an inner cylindrical shell forming a main body portion in said shell provided with abnormally spaced and abnormally deep inner, top and bottom transverses circumferentially separated from each other and in the same transverse planes; an outer shell spaced from and extending beyond the ends of said inner shell portion to form the bow and stern of the vessel; outer transverses in the same plane as said inner transverses provided with notches, and circumferentially closing said spaces between said top and bottom transverses; continuous longitudinals passing through said notches; and a plurality of bulkheads in the same transverse planes as sets of said outer and inner transverses, said bulkheads spaced farther apart than said transverse frames, substantially as described.

5. In a ship of the character described the combination of an inner cylindrical shell portion blunt at both ends; an outer shell portion extending beyond each end and tapered to form the bow and stern portions of the vessel; an expansion trunk rigid with said inner shell portion; a deck portion connecting said inner and outer shell portions; and abnormally widely spaced and abnormally deep transverses each made up of independent portions located inside and outside said inner shell and expansion trunk portions, substantially as described.

6. In a ship of the character described the combination of an inner cylindrical shell portion blunt at both ends; an outer shell portion extending beyond each end and tapered to form the bow and stern portions of the vessel; an expansion trunk rigid with said inner shell portion; a deck portion connecting said inner and outer shell portions; abnormally widely spaced and abnormally deep transverses made up of independent top and bottom portions located inside of said inner shell; outer independent transverses located between said inner and outer shells and spanning the space between said top and bottom portions; and transverse bulkheads provided with vertically disposed stiffening plate members dividing said inner and outer shell portions into compartments, substantially as described.

In testimony whereof I affix my signature, in presence of two witnesses.

ALVIN A. DAUGHERTY.

Witnesses:
STELLA CAMPBELL,
J. T. BLACKMOOR.

Copies of this patent may be obtained for five cents each, by addressing the "Commissioner of Patents, Washington, D. C."